Feb. 9, 1943.  J. A. MARQUIS ET AL  2,310,248
CHEESE CUTTING MACHINE
Filed May 10, 1941
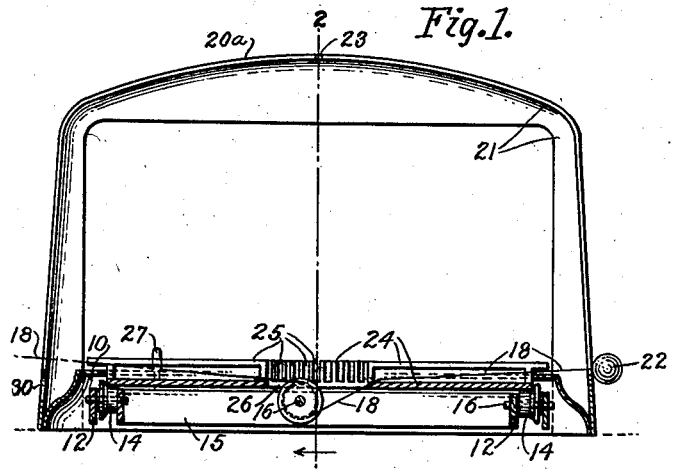
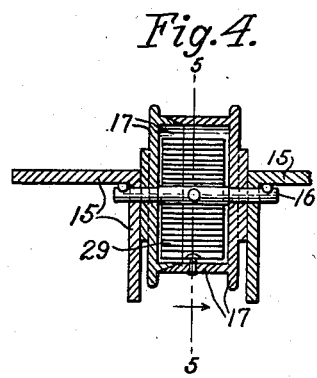
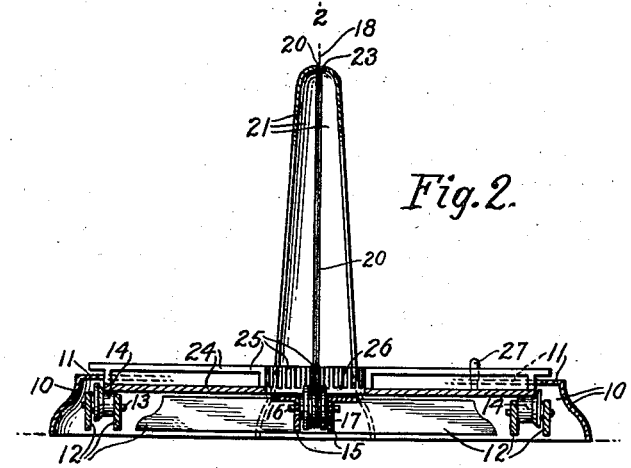
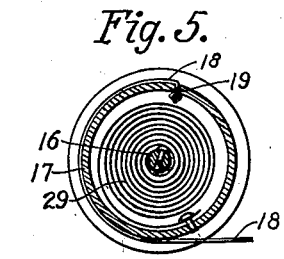
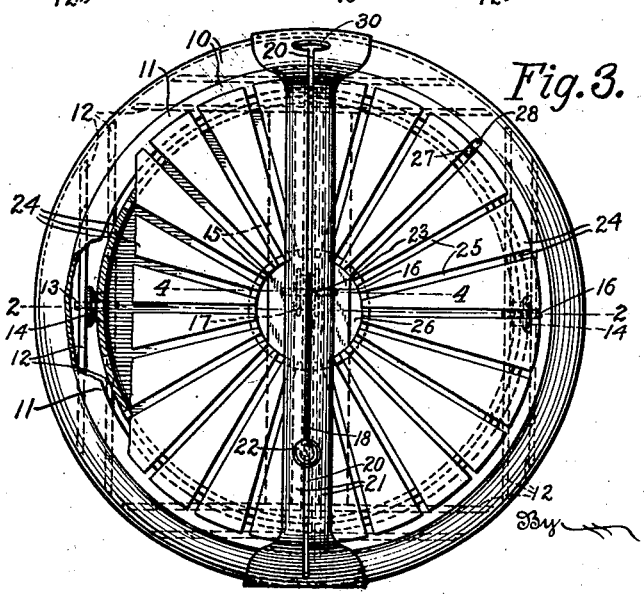
Inventors;
J. A. Marquis
and
A. G. Stephenson.
By Sterling P. Buck,
Attorney.

Patented Feb. 9, 1943

2,310,248

UNITED STATES PATENT OFFICE 2,310,248

CHEESE CUTTING MACHINE

Joseph A. Marquis and Albert G. Stephenson,
Seattle, Wash.

Application May 10, 1941, Serial No. 392,860

6 Claims. (Cl. 31—22)

This invention relates to machines for cutting cheeses and the like, and is of the type in which a flexible wire constitutes the cutting or sawing element.

One object of this improvement over other machines of said type is to provide a combination that is operable to cut a cake or block of cheese either all the way through from diametrically opposite points, or alternatively, to cut it from center to circumference or periphery into substantially equal segmental fractions of the cake or block; and to this end, a further object is to provide means to secure or support the cutting portion of the wire in a vertical position where it is axially alined with the axis of rotation of a radially slotted table-top on which the cheese or other material may be concentered; so that the wire does not interfere with rotation of the table-top when so disposed vertically, and so the cutting may be effected alternately from periphery to center and from center to periphery of the cake or block of material, thus saving considerable time in each cutting operation.

Another object is to provide a machine of this type that is capable of being operated so as to easily cut or saw through the crust or coating of the cheese, thus avoiding the necessity of using a knife-blade for such purpose, also avoiding the breaking of the crust and the waste consequent to such breaking.

Another object is to provide a machine of this type with a wire-guiding arch that is securely united with diametrically opposite parts of the base on which the table is pivotally mounted, so that the wire-guiding edge of the arch is securely maintained in position against any pressure resulting from accident or rough usage.

Another object is to provide such machine with a rotary table that is supported entirely at its peripheral edge-portion and has an opening at its center for receiving the upper part of a wire-pulling and winding means that cooperates in the operations of cutting or sawing a cake or block of cheese or the like on the table-top.

Another object is to provide, in combination with a rotary table having pairs of oppositely disposed radial slots, a manipulative detent movable into and out of engagement with the table so as to alternately hold or detain the respective pairs of slots under the wire-guiding edges of the arch and permit the table to be turned, at will of the operator or user of the machine.

Another object is to provide, in a machine of this type, a free platform, that is, a platform that merely rests and rotates on the base without being secured thereto, so the platform can be very easily and quickly removed and inverted for expelling crumbs, or for cleaning and sterilizing and for gaining access to the parts that need to be lubricated.

Other objects and important features are pointed out or implied in the following details of construction and combination, in connection with the accompanying drawing in which, similar reference numerals refer to similar parts throughout the several views, and in which:

Fig. 1 is a central vertical sectional view, except that the sectioned parts under the rotary table are a little off from the center, and the rotary elements are in full elevation.

Fig. 2 is a substantially central sectional view, the section being at right angles to that of Fig. 1, or along the line 2—2 of Fig. 3.

Fig. 3 is a top plan view, except that some parts are broken away and in section at the left side, some hidden parts indicated in broken lines, and some omitted.

Fig. 4 is an enlarged vertical sectional view taken along the line 4—4 of Fig. 3, showing the interior of the wire-pulling device, the wire being here omitted.

Fig. 5 is a vertical central view of the winding and wire-pulling drum and spring shown in Fig. 4, the section being at right angles to that of Fig. 4, and the drum-attached end of the cutting wire being included.

Fig. 6 is an enlarged detail of a form of cutting or sawing wire that may be employed, in lieu of smooth wire, for sawing through the crust or covering of cheese cakes or blocks.

The invention is described in detail, in connection with the drawing, as follows:

The base of the machine is, as shown in this embodiment of the invention, a rigid circular structure whose main element 10 is an annulus having an internal horizontal flange 11. Within this annulus is disposed four pairs of bearing-beams 12 having their ends united with the inner surface of the annulus and constituting elements of the base and having pintles 13 engaged therewith, and on these pintles are rotatably mounted flanged wheels 14. A pair of bearing-beams, preferably L-beams, 15, have their ends united with opposite beams 12 and constitute elements of the base and are parallel to and at opposite sides of a diametral vertical plane of the annulus 10, and these beams 15 are engaged with a pintle 16 on which is rotatably mounted a peripherally flanged winding drum 17 that carries a portion of a cutting or sawing wire 18 having one end secured to the drum at 19; and the free end of this wire extends out through a slot 20 of a wire-guiding arch 21. This arch 21 is preferably though not essentially formed of sheet metal, and while it is here shown as if formed of a single blank, it may be formed of several primarily separate elements that are united in any appropriate way; and it is substantially inverted U-shaped and has its lower ends united with the annulus 10 by any appropriate securing means. Only half of this arch 21 is shown in Fig. 1, and its near edge 20a is a wire-guiding edge which is effective and useful whether a second one of such edges is provided or not; but such second one is provided, as margins of the slot 20, as seen in Figs. 2 and 3, adds utility, inasmuch as these margins confine the cutting wire in its operative position, or cooperate with the handle 22 for thus confining the wire in any one of the positions indicated in the drawing. In this connection, it should be noted that the wire 18 can be swung from the position shown at right (in Fig. 1) to the vertical position along the line 2—2, and thence to the broken-line-position shown at left in Fig. 1. A notch or index 23 is provided at the upper-central position in one of the guiding edges 20a to receive the free end-portion of the wire and indicate to the user that the wire's free end portion is then in exact vertical position and in axial alinement with a rotary table 24 that holds the cheese blocks or cakes, respectively, to be cut.

The rotary table comprising carriage 24 is a circular unit or plate having its top formed with a series of narrowly spaced radially disposed slots 25 that extend from the outer edge or periphery to an opening 26 around the axial center of the table or carriage 24 whose lower crumb-receiving part or plate has its peripheral edge seated on the wheels 14 and retained by their flanges in a substantially constant axial position in which the axial center of the table is vertically alined with the notch 23 of the arch 21. The upper and lower plates of the table 24 are united by any appropriate means, or may be formed integrally. The drum 17 is axially offset or eccentric to the axial center of the table, having its pintle or axis of rotation, 16, at such distance from the axial center of the table that the unwinding point of the drum is at said axial center and directly under the notch 23; therefore, when the unwound part of the wire 18 is engaged with said notch, it is directly in the axis of rotation of the table and of a cake or block of cheese or material on the table and can be moved down to either of the two positions shown at 18 in Fig. 2, thereby cutting from center to periphery of the cheese or other material.

For retaining the table 24 at any one of a number of adjusted positions, for avoiding uneven cutting of the block or cake, any appropriate detent may be provided, for instance, a stud or detent 27 may be slidably seated in a slot 28 of the flange 11 and normally snugly fitted in the outer end of any one of the slots 25; and when it is desired to turn the table about its invisible and intangible axis, a hand of the user or operator can grasp and pull the detent 27 out of the respective slot 25 for freeing the table from its control. In this connection, it should be understood that the table is not secured to any part of the machine, but is quite free to be raised and removed from the wheels 14; and this is important for cleaning and sterilizing the table and for gaining access to the axes of the wheels 14 and drum 17 for lubricating them. In preparing for thus removing the table, the handle 22 is passed inwardly through an opening 30 at one end of the slot 20 and downwardly through the opening 26 of the table.

A convolute spring 29 has its inner end secured to the fixed axle or pintle 16 and its outer end secured to the drum in which it is disposed. The wire 18 is wound around the drum in the proper relation to cause the spring 29 to be wound up or tensioned when the wire is pulled for unwinding it; but when the pull of the wire is diminished below the tension or pull of the spring, the latter constitutes the means for winding a considerable part of the wire on the drum; so the spring and drum constitute the mechanical wire-pulling means, while the handle 22 in the hand of the user is the means for pulling the wire in the opposite direction. By these opposite pulling means, the cutting or sawing part of the wire can be reciprocated so as to facilitate and expedite the cutting operations, and to maximize the facility and expedition, the cutting part of the wire may be of the form shown in Fig. 6 where the cross-section of the wire is angular (square or triangular) and its sharp edges serrated, whereby it constitutes a novel form of saw having several sets of teeth so it will saw through crusts and coatings of cheeses and thus preclude the necessity of using a knife at either the start or finish of the respective cutting excursions through a block or cake of cheese.

Though we have described this embodiment of our invention specifically, we have no intention to limit our patent protection to these specific details, for the invention is susceptible of numerous modifications within the scope of the inventive ideas as broadly claimed.

We claim as our invention:

1. In a machine for cutting cheeses and the like, the combination of a base that includes bearing-elements, a radially slotted table mounted for rotation on said base and having its axis of rotation vertically disposed, a winding drum rotatably connected to one of said bearing elements, a cutting wire having an end secured to said drum, a spring engaged with said winding drum in operable relation for rotating the drum so as to wind a portion of said cutting wire on the drum, and an arch united with opposite sides of said base and having a wire-guiding edge that extends horizontally from a point above the axis of the table and downwardly to points radially beyond and below diametrically opposite points of the table, said cutting wire having an unwound part that extends from said winding drum to and beyond said wire-guiding edge and terminating in a handle, for purposes specified.

2. The combination defined by claim 1, said drum having its axis of rotation horizontally disposed at the proper distance from the axis of said table to retain the unwinding point of the drum substantially in axial alinement with said table, so that the unwound part of the wire is substantially alined with the axis of the table when said unwound part is in its vertically disposed position, for purposes specified.

3. The combination defined by claim 1, said arch having a second wire-guiding edge slightly spaced from the first said guiding edge and complemental therewith to form a narrow slot through which said unwound part of the cutting wire extends, but through which said handle cannot pass, so the handle and winding drum cooperate to keep the cutting wire taut and in different adjusted positions along the slot.

4. The combination defined by claim 1, the radial slots of said table being arranged in diametrically alined pairs that extend to and through the outer edge of the table, and detaining means on said base and interchangeably movable into engagement with any one of the radial slots so as to detain said table in such position that one of said pairs of slots is substantially in the same vertical plane as that of the said guiding edge of said arch, so the cutting wire is thereby directed into a pair of the radial slots as it is moved down to the respective lower ends of said wire guiding slot.

5. The combination defined by claim 1, and means at the top of said arch to serve as an index of the substantially vertical position of the unwound part of the cutting wire when the latter is at said index and co-axial with the axis of rotation of a cheese cake or block to be turned with said table.

6. The combination in a machine for sawing cheese blocks and the like, of a table comprising an upper part having a slot therein and a lower crumb-receiving part under said slot, a wire-pulling means at one end of said slot, a cutting wire having one end secured to said wire-pulling means and having an unwound portion adapted to be raised from and lowered into said slot, and a handle on said unwound portion of the cutting wire and adapted to be grasped by an operator for cooperating with said wire pulling means to effect a reciprocative sawing motion of said unwound portion for expediting the cutting or sawing through crusts and coatings of cheeses and the like, said table being free for removal from said wire-pulling means so it can be separately manipulated for cleaning crumbs and the like from said crumb-receiving part.

JOSEPH A. MARQUIS.
ALBERT G. STEPHENSON.